United States Patent [19]

Schwan et al.

[11] Patent Number: 5,614,584
[45] Date of Patent: Mar. 25, 1997

[54] PROCESS FOR THE MANUFACTURE OF AQUEOUS COATING AGENTS, THE COATING AGENTS AND THEIR USE

[75] Inventors: Heinrich Schwan; Hans-Peter Patzschke, both of Wuppertal; Franjo Gol, Leverkusen, all of Germany

[73] Assignee: Herberts Gesellschaft Mit Beschranker Haftung, Wuppertal, Germany

[21] Appl. No.: 663,853

[22] Filed: Jun. 19, 1996

Related U.S. Application Data

[63] Continuation of Ser. No. 585,658, Jan. 16, 1996, abandoned, which is a continuation of Ser. No. 287,230, Aug. 8, 1994, abandoned.

[30] Foreign Application Priority Data

Aug. 9, 1993 [DE] Germany .................... 43 26 670.3

[51] Int. Cl.$^6$ ................ C08J 3/00; C08K 3/20; C08L 75/00; B05D 3/02
[52] U.S. Cl. ................ 524/591; 524/539; 524/839; 524/840; 427/372.2; 427/385.5
[58] Field of Search .................... 524/591, 839, 524/840, 539; 427/372.2, 385.5

[56] References Cited

U.S. PATENT DOCUMENTS

| | | | |
|---|---|---|---|
| 4,066,591 | 1/1978 | Scriven et al. | 524/591 |
| 5,194,487 | 3/1993 | Jacobs | 524/591 |
| 5,280,062 | 1/1994 | Blum et al. | 524/591 |

FOREIGN PATENT DOCUMENTS 0358979  3/1990  European Pat. Off. .

Primary Examiner—Paul R. Michl
Assistant Examiner—Patrick Niland
Attorney, Agent, or Firm—Merchant, Gould, Smith, Edell, Welter & Schmidt

[57] ABSTRACT

A process for the manufacture of aqueous coating agents, obtained by mixing an aqueous dispersion of one or more water-dispersible or water-soluble binders that contain groups reactive with isocyanate with one or more polyisocyanates that are liquid or are present in liquid form as a result of the addition of organic solvents, as well as optionally pigments, fillers and/or customary lacquer additives, wherein an aqueous dispersion is used of one or more binders with a number-average molecular weight (Mn) of 1000 to 100,000, groups reactive with isocyanate equivalent to a hydroxyl number of 20 to 250 and an acid number of 10 to 100, whose acidic groups are at least partly neutralized by one or more polyamines with primary and/or secondary amino groups mixed with one or more tertiary monoamines, and the polyisocyanate that is liquid or present in liquid form is dispersed in this dispersion shortly before the use of the coating agents; and the coating agents obtained.

12 Claims, No Drawings

PROCESS FOR THE MANUFACTURE OF AQUEOUS COATING AGENTS, THE COATING AGENTS AND THEIR USE

This is a continuation of application Ser. No. 08/585,658, filed Jan. 16, 1996 now abandoned which is a Continuation of application Ser. No. 08/287,230, filed Aug. 8, 1994, now abandoned.

The invention relates to the manufacture of coating agents based on aqueous binder dispersions and isocyanate cross-linkers dispersed or emulsified therein as well as the coating agents obtained. The coating agents can be used in the lacquer industry, especially in the manufacture of multicoat lacquer finishes, for example in the motor vehicle sector.

Two-component polyurethane coating agents are widespread in the literature. They have already shown their particular advantages in practice. While they were previously manufactured on the basis of organic solvents, more recent coating agents based on two-component isocyanate systems are also described as aqueous coating agents.

Thus, in EP-A-0 358 979 aqueous two-component coating agents are described that comprise a polyol component based on polymers of unsaturated monomeric compounds and a polyisocyanate component with a specific viscosity. In addition, the polyisocyanate component must be emulsified into the polyol component.

In EP-A-0 496 205, aqueous two-component coating agents are described that are formulated on the basis of aqueous polyester components having at least urethane, carboxylate and hydroxyl groups as well as of polyisocyanate components with a specific viscosity that are emulsified into the polyester component directly before manufacture. In the case of the coating agents described, rapidly reacting isocyanate components are used. These react during the emulsification into the aqueous phase with the water which is present in large excess. This leads to a mutual conversion of the components which is difficult to predict.

Likewise, an indeterminate amount of the isocyanate is consumed in side reactions even before the cross-linking reaction. The coating agents there described therefore have the disadvantage of different proportions of cross-linking points and thereby of a poor reproducibility.

It is described in DE-A-35 29 249 how polyisocyanates may be added to aqueous plastics dispersions for alteration of the properties. These plastics are not, however, polyhydroxy compounds, which lead to customary polyurethanes, but inert, possibly solid, plastics. A disadvantage of the coating agents described there is the lack of cross-linking. The latter is particularly important in the lacquer industry in order to obtain the required properties. In addition, the particles, which exist essentially as solid, are present in a form unsuitable for lacquer use, since in systems that cross-link at low temperature they cannot flow sufficiently and so do not produce a homogeneous surface.

Aqueous dispersions of encapsulated isocyanates are described in EP-A-0 505 889. These are manufactured by dispersion of polyisocyanates in water and addition of polyamines with several reactive amino groups so that a dense covering of the isocyanate groups with a urea envelope is formed by reaction. After destruction of the urea envelope around the polyisocyanate droplets, these essentially stable isocyanate dispersions can lead to further reactions. The coating agents manufactured by use of these polyisocyanate dispersions lead to coatings that have an undesirable sensitivity to water.

The object of the invention is the provision of coating agents that, with sufficient processing time, lead to a rapid cross-linking reaction and bubble-free films with improved properties, such as higher water resistance, especially in the case of spraying with the attainment of high film thicknesses.

It has become apparent that this object can be achieved by provision of an aqueous coating agent that is manufactured by mixing a special aqueous dispersion of one or more water-dispersible or water-soluble binders that contain groups reactive with isocyanate with one or more polyisocyanates that are liquid or present in liquid form as a result of the addition of one or more organic solvents, as well as optionally pigments, fillers and/or customary lacquer additives. This process is characterised in that an aqueous dispersion or solution is used of one or more binders with a number-average molecular weight (Mn) of 1000 to 100,000, with a content of groups reactive with isocyanate, calculated as a hydroxyl number, of 20 to 250 and with an acid number of 10 to 100, whose acidic groups are at least partly neutralized by one or more polyamines with primary and/or secondary amino groups mixed with one or more tertiary monoamines, and that the polyisocyanate or polyisocyanates that are liquid or present in liquid form are dispersed in this aqueous dispersion shortly before the use of the coating agent.

The water-dispersible or water-soluble binders that can be used according to the invention contain groups reactive with isocyanates, for example OH groups, SH groups and/or CH-acid groups, preferably OH groups.

The polyisocyanates that are liquid or liquefied by the addition of one or more organic solvents preferably have a viscosity of less than 10,000 mPa.s.

The binders used are present in at least partly neutralized form; preferably at least 40%, most preferably at least 50%, of the acid groups are neutralized.

The coating agent according to the invention is a two-component coating agent; the binder component A) and the polyisocyanate component B) are therefore mixed together shortly before, e.g. up to 2 hours before, the application.

It has become apparent that coating agents manufactured by the process according to the invention have a good applicability. Their pot life, i.e. the time that they remain in a usable state after the mixing of the components, is high. Their cross-linking properties are reproducible. The coating agents lead to water-resistant coatings. The coatings obtained are bubble-free, even when spraying in high film thicknesses in several spraying operations.

As binder component A) there may be used for example customary water-soluble or water-dispersible binders such as are common and described for two-component coating agents, e.g. two-component lacquers. For example, binders such as are described in DE-A-42 26 243, EP-A-0 496 205, DE-A-26 24 442, EP-A-0 469 389, EP-A-0 496 205 and EP-A-0 358 979 may be used. These are the customary water-dispersible binders based on polyacrylate resins, polyester resins, polyurethane resins or (meth)acrylated polyester resins or polyurethane resins that are dispersible in the water phase on account of anionic and possibly additional hydrophilic groups. The hydrophilic groups may be polyether structures and/or polyhydroxyl groups. The anionic groups are formed by neutralization of acidic groups, e.g. of carboxyl groups or sulphonic acid groups. The latter serve after neutralization for the ionic stabilization of the binders in the water phase. The binders usable according to the invention furthermore contain functional groups that can react with isocyanates. These are in particular NH-, OH-, SH- or CH-acid groups that are reacted onto the polymer skeleton. A crosslinking with isocyanate groups is possible by way of these groups.

The molecular weight of the binders may vary greatly. For example, the number-average (Mn) may amount to 1000 to 100,000, preferably 3000 to 30,000. The binders may be linear or branched in structure. They may also bear various substituents. The binders must have centres that can react with isocyanate groups. These are for example substituents that bear reactive hydrogen atoms. Examples of these are OH groups, SH groups and/or CH-acid groups.

Suitable oil-free, anionic polyesters are manufactured by known single-stage or multistage processes by means of azeotropic polycondensation or esterification in the melt (e.g. at reaction temperatures of 140° to 240° C.) from polyalcohols and polycarboxylic acids, the proportions being so chosen that the equivalent ratio of hydroxyl groups to carboxyl groups exceeds 1. The hydroxyl number falls in the customary range between 10 and 200. Suitable polycarboxylic acids contain for example two or more carboxyl groups on a linear or branched aliphatic or aromatic skeleton with, for example, 4 to 36 carbon atoms. Usable also are the esterifiable derivatives of the polycarboxylic acids such as anhydrides or methyl esters or hydroxyl-group-containing carboxylic acids and sterically hindered carboxyl groups. Preferred polyalcohols are aliphatic and araliphatic alcohols with from two to six, preferably two to four, primary, secondary and/or tertiary hydroxyl groups and 2 to 24 carbon atoms per molecule. The linear or substituted carbon chains may be interrupted by ether or ester groups.

Suitable anionic polyacrylate resins are manufactured by known processes, for example by radical copolymerization in solution, e.g. at temperatures of 80° to 140° C., or by emulsion polymerization, e.g. at temperatures of 30° to 95° C., with addition of initiators. Used as reactive, unsaturated monomers are monomers containing hydroxyl groups, such as for example hydroxyalkyl (meth)acrylate esters or hydroxyalkyl (meth)acrylamides in combination with styrene or styrene derivatives and/or methacrylate and/or acrylate esters of different chain lengths. The binder must contain reactive hydroxyl groups equivalent to a hydroxyl number of 10 to 300. The binder molecule furthermore contains ionic groups or substituents convertible to ionic groups that are introduced by means of appropriate substituted monomers, preferably acrylic and methacrylic acids. Portions of unsaturated monomers containing poly(ethylene oxide) groups may also be copolymerized in. After manufacture of the aqueous dispersion the organic solvents used for the dissipation of heat are largely distilled off.

Suitable anionic polyurethane resins are manufactured by known processes by single- or multistage reaction of polyols with polyisocyanates e.g. at temperatures of 80° to 150° C., the proportions being so chosen that the equivalent ratio of hydroxyl groups to isocyanate groups exceeds 1. The hydroxyl number preferably falls between 25 and 250. Usable as polyalcohols are pentaerythritol, dipentaerythritol, trimethylolpropane, ditrimethylolpropane and/or glycerol, that are modified either with saturated or unsaturated, aliphatic and/or aromatic monocarboxylic acids, especially fatty acids, and/or by portions of fairly high-molecular polyether diols, polyester diols, polycarbonate diols, polyesterimide diols, polyamido diols and/or polyacrylate diols. The carboxyl groups necessary for the neutralization are introduced by incorporation of polycarboxylic acids such as trimellitic anhydride or of dialkanolalkanoic acids such as dimethylolpropionic acid or dimethylolbutyric acid. Nonionic hydrophilic poly(ethylene oxide) groups may also be introduced by means of suitable OH or NCO monomers.

The types of resin exemplified may in addition be modified with poly(ethylene oxide) monoethers or used as mixtures.

The polymers containing OH groups described may optionally be subjected to modification reactions in order if desired to carry out a chain lengthening, an increase of molecular weight or a modification with monofunctional substances. Serving this purpose are reactions that proceed by urethane formation, e.g. with mono- or polyisocyanates by urethane formation or the copolymerization with unsaturated monomers. A chain lengthening or a specific increase of molecular weight may also be carried out by a grafting or condensation reaction. The copolymerization in this connection may be carried out both in organic solution and, preferably, after dispersion in aqueous solution or emulsion. Acrylated polyesters or acrylated polyurethane resin dispersions, for example, are then formed.

The binders usable according to the invention contain substituents convertible to anionic groups. Most preferred as acid groups are carboxyl groups. The acid number of the binders is 10 to 100, in particular above 15, especially above 20 and above 25 and preferably below 60, particularly below 50. The binder resins, after conversion of at least a part of the groups into the ionic form, are dispersible or soluble in the water phase.

According to the invention the binders are neutralized with polyamines having at least two primary and/or secondary amino groups, e.g. with diamines. These polyamines are used in combination with at least one tertiary monoamine. The polyamines are preferably used in an amount of 5 to 25 meq and the tertiary monoamines preferably in an amount of 10 to 45 meq, relative in each case to 100 g resin solids of the binder. The absolute amount of the meq of the tertiary amines preferably exceeds that of the polyamines. According to another preferred embodiment, the equivalent ratio of tertiary monoamines to polyamines is 2:1 to 6:1 at degrees of neutralization of the binder resin of 50 to 100%. The amine mixture is added in such an amount and so balanced that there is neutralization for sufficient stabilization of the binders. If, as mentioned above, the binder resins are modified with poly(ethylene oxide) monoethers, the amounts of tertiary monoamine or salt groups can be greatly reduced.

The polyamines are preferably relatively low-molecular amines, e.g. with a molecular weight below 500. Suitable examples are ethylenediamine, 1,2- and 1,3-propanediamine, 1,4-butanediamine, 2-methylpentanediamine, 1,6-hexanediamine, 3-amino-1-methylaminopropane, N-methyldipropylenetriamine, 3-amino-1-cyclohexylaminopropane, N,N'-dimethylethylenediamine, 2,2-dimethyl-1,3-propanediamine, 1-amino-3-amino-3,5,5-trimethylcyclohexane (isophoronediamine), 1,2- and 1,4-cyclohexanediamine, 4,4'-diaminodicyclohexylmethane, 3,3-dimethyl-4,4'-diaminodicyclohexylamine, piperazine, 2,5-dimethylpiperazine, N,N'-bis(2-aminoethyl)piperazine, p-, m-, or o-phenylenediamine, 4,4'-diaminodiphenylmethane, polyoxypropyleneamines such as 4,9-dioxadodecane-1,12-diamine or 4,7,10-trioxatridecane-1,13-diamine and/or aminoethylethanolamine.

Used as tertiary monoamines are for example trialkylamines, such as trimethylamine, triethylamine, diethylbutylamine, dimethylbenzylamine, N-methylmorpholine, but also alkanolamines with tertiary amino groups such as dimethylethanolamine, dimethylisopropanolamine or methyldiisopropanolamine. Volatile tertiary trialkylamines that contain no groups reactive with isocyanate are preferred.

The binder dispersions formed (component A) are stable in storage and may be mixed with other binders, e.g. paste resins and optionally other components of the coating agents unreactive with the binders A).

The polyisocyanate component B) consists of any organic polyisocyanates (e.g. diisocyanates), with aliphatically, cycloaliphatically and/or aromatically bonded free isocyanate groups, that at room temperature are liquid or liquefied by addition of one or more organic solvents. The polyisocyanate component preferably has a viscosity at 23° C. of 1 to 6000 mPa.s, more preferably above 5 and below 3000, most preferably below 500 mPa.s. The polyisocyanate component B) preferably consists of polyisocyanates or mixtures with exclusively aliphatically and/or cycloaliphatically bonded isocyanate groups, with an average functionality of 1.5 to 5, preferably 2 to 3. The polyisocyanates may, if necessary, be used in mixtures with small amounts of inert solvents in order to lower the viscosity into the range mentioned. The amount of such solvents must, however, be such that there is present in the coating agents obtained according to the invention a maximum of 20%, preferably below 10%, of solvent. Preferred solvents are those that do not react with the isocyanate groups such as, for example, aromatic hydrocarbons, esters, ethers or ketones. In order to achieve a good dispersibility of the polyisocyanates, the viscosity may be adjusted to a suitable low value. The dissolution of highly viscous or solid polyisocyanates in water-miscible organic solvents that do not react or react only slowly with isocyanates also serves for this purpose. Preferred for this purpose are alcohols with sterically hindered alcohol groups, ketoalcohols or alkoxyalkanols such as butoxyethanol, butyldiglycol, methoxyisopropanol or diacetone alcohol. With them a polyisocyanate solution is prepared without heating, shortly before use up to a maximum of 1 to 2 hours before use, that, at a solids content above 40%, preferably above 50 and below 95 wt %, has a viscosity of 0.5 to 2000 mPa.s, preferably above 1 and below 20 mPa.s. By this procedure a fine dispersion of the polyisocyanate in the coating agent is achieved without incorporation of hydrophilic groups into the polyisocyanate. In addition, highly viscous and/or solid polyisocyanates also can be processed without problems.

Suitable polyisocyanates according to the invention are for example the common so-called aromatic lacquer polyisocyanates based on 2,4-diisocyanatotoluene or 4,4'-diisocyanatodiphenylmethane or their technical mixtures with their isomers or homologues. Particularly suitable, however, are the lacquer polyisocyanates based on aliphatic isocyanates. Examples of such polyisocyanates are hexamethylene diisocyanate, 1-isocyanato-3,3,5-trimethyl-5-isocyanatomethylcyclohexane (IPDI) or bis(isocyanatocyclohexyl)methane and the derivatives known as such of these isocyanates having biuret, allophanate, uretdione or isocyanurate groups. The polyisocyanate can be modified, at least in part, with poly(ethylene oxide) alcohols or ionic groups in order to facilitate the dispersion of component B) in the aqueous dispersion.

For application according to the invention as component B), sterically hindered polyisocyanates are most preferably used, at least in part. In these polyisocyanates, linear or branched substituents are present e.g. in the alpha position to the NCO groups. These are for example polyisocyanates, e.g. diisocyanates, based on aromatic or alicyclic rings or on linear or branched carbon chains with 1 to 12 carbon atoms.

Examples of these are 1,1,6,6-tetramethylhexamethylene diisocyanate, 1,1,5-dibutylpentamethylene diisocyanate, p- or m-tetramethylxylylene diisocyanate, 3(4)-isocyanatomethyl-1-methylcyclohexyl isocyanate and/or the corresponding hydrogenated homologues.

These isocyanates may likewise be suitably converted to higher-functional compounds, for example by reaction with polyols or by reaction with water. A group of suitable aliphatic polyisocyanates, such as for example the ester isocyanate based on hexane diisocyanate and pentaerythritol, are manufactured by selective reaction of silylated polyalcohols with polyisocyanates. They have particularly advantageous low viscosities.

The polyisocyanate component B) may also comprise any mixtures of the di- or polyisocyanates exemplified, wherein for example the mixture may preferably comprise relatively reactive and sterically hindered polyisocyanates as well as di- and higher-functional polyisocyanates. A hydrophobic modification with long-chain fatty alcohols has proved advantageous.

The coating agents prepared according to the invention may furthermore contain customary lacquer technology additives, for example agents influencing the rheology, such as highly disperse silicic acid, layered silicates or polymeric urea compounds; thickeners, for example water-soluble cellulose ethers as well as synthetic polymers with ionic groups and/or groups inducing association such as poly(meth)acrylic acid, poly(vinyl alcohol), poly(meth)acrylamide, poly(vinylpyrrolidone) or polyurethane resins, or also hydrophobically modified ethoxylated urethanes or poly(meth)acrylates. Other examples are antisettling agents, levelling agents, light stabilizers, antifoaming agents, such as for example silicone-containing compounds; and wetting agents as well as adhesion promotors. Wetting agents are also understood to include e.g. known paste resins such as are described e.g. in DE-A 40 00 889 that can be used for the better dispersion and grinding of pigments and fillers. Catalysts can be used for the acceleration of curing; it is preferred, however, to cure for example by thermal energy, without the use of a catalyst.

Such additives are preferably contained in the binder component A). However, it is also possible to incorporate at least portions thereof in component B), as long as no reactive groups are present.

Customary lacquer solvents are suitable as solvents optionally present in small amounts: they can originate from the manufacture of the binders or be added separately.

Examples of such solvents are mono- or polyhydric alcohols, glycol ethers or glycol esters, glycols, ketones and/or aromatic or aliphatic hydrocarbons. It is also possible to manufacture aqueous, solvent-free systems.

Customary inorganic and/or organic coloured pigments and/or special-effect pigments, such as e.g. metallic, nacreous or interference pigments, may be used as optional pigments. The amount is for example between 0.5 and 15 wt % relative to the coating agent. The metallic pigments such as Al-bronzes may also be used together with one or more other non-metallic pigments or dyes, e.g. microtitanium dioxide.

Examples of usable known colouring transparent or opaque organic or inorganic pigments are quinacridones, perylenes, phthalocyanines, indanthrenes, isoindolines and/or halogenated thioindigo pigments. Examples of inorganic pigments are carbon black, titanium dioxide, chromium oxides, lead chromates or iron oxide pigments or transparent pigments: fillers such as silicic acid, barium sulphate, talc or layered silicate may optionally also be added. Fillers and primers and preferably solid-coloured base coats are manufactured with these colouring pigments.

The coating agents ready for use are prepared shortly before use by simple mixing of components A) and B) at room temperature. In doing so, the polyisocyanate component B) may be added in a neutralized, concentrated or dilute aqueous polymer dispersion. The polymer dissolved or dispersed in water then takes over the function of an emulsifier. The viscosity may be adjusted to a suitable value for use by the addition of further water. The amount of the polyisocyanate component is then such that a ratio of NCO groups to groups reactive with isocyanate, e.g. OH groups, of preferably 0.5:1 to 5:1, more preferably 0.8:1 to 2:1, is obtained; quantitatively, preferably 40 to 95 wt % (most preferably 50 to 90 wt %) of component A) and 60 to 5 wt % (most preferably 50 to 10 wt %) of component B) are mixed together, the percentages in each case relating to the resin solids content.

As a result of the procedure according to the invention with the special neutralization agents for the acid groups of the binder dispersion, a good miscibility of components A) and B) is achieved. Furthermore, a sufficiently long pot life results, i.e. the reaction of the isocyanate groups with the functional groups of the binder is retarded in the aqueous phase. If, however, the coating agents are dried, a rapid and reliable reaction starts. It is possible by the procedure according to the invention to work with smaller excesses of isocyanate, since side reactions of the isocyanate groups with the water are reduced.

Aqueous coating agents, for example for non-pigmented clear coats or pigmented base coats, fillers, gravel impact protective coats or top coats, can be manufactured from the binders. In doing so, pigments, additives and further binders can be tailored to the particular application. The binders are particularly suitable for the manufacture of aqueous base coats. In the case of multicoat lacquer finishes, a particularly good adhesion to filler coats and top coats is achieved by the use of the coating agents according to the invention.

The coating agents according to the invention can be applied by known methods, e.g. preferably by spraying. The films obtained can be cross-linked at low temperatures, for example at temperatures from room temperature to 80° C., preferably below 60° C. It is, however, obviously also possible to cure at higher temperatures, for example at up to 150° C. This can be done in particular for short periods. In this way the coating agents according to the invention are suitable for the lacquering of temperature-sensitive substrates. Examples of sensitive substrates are plastics, such as polyurethanes, polycarbonates or polyolefins. Other substrates, such as metal substrates, in particular the substrates known in the automobile industry, e.g. iron, aluminium, magnesium or alloys thereof, are obviously also suitable. The substrates to be lacquered may also have already previously been coated, for example with primers or fillers.

One-coat lacquer finishes or multicoat lacquer finishes can be manufactured. It is preferred in this connection that if the aqueous coating agents according to the invention are used as base coats for multicoat lacquer finishes, an overcoating with aqueous clear coats or powder clear coats is carried out.

In the following, the invention is explained in more detail by means of examples.

EXAMPLE 1

Preparation of a binder
a) Preparation of a base resin
The following components are mixed together in a 6-l reaction flask fitted with reflux condenser, stirrer, thermometer and water entrainer:

| | |
|---|---|
| Trimethylolpropane | 1610.0 g |
| Coconut oil fatty acid | 1354.0 g |
| Hexahydrophthalic anhydride | 1143.0 g |
| Xylene | 170.0 g |

The reaction mixture is heated to about 230° C., while water is distilled off, until an acid number of less than 2 mg KOH/g is reached.
b) Preparation of a pre-adduct
The following components are mixed together in a 4-l reaction vessel fitted with reflux condenser, stirrer and thermometer:

| | |
|---|---|
| Acetone | 1100.0 g |
| Dimethylolpropionic acid | 212.5 g |
| Isophorone diisocyanate | 704.0 g |

The reaction mixture is stirred at 60° C. until a clear solution is formed.
c) Preparation of an aqueous resin dispersion
500.0 g of the base resin obtained under a) and 300.0 g of the pre-adduct obtained under b) are mixed together in a 4-l reaction flask fitted with reflux condenser, stirrer and thermometer. The base resin and the pre-adduct are reacted with stirring at 60° C. until the NCO content is less than 0.2%. A mixture of 12.0 g of dimethylethanolamine and 4.5 g isophoronediamine is then added with intensive stirring, followed by 1000.0 g of deionized water. The temperature is now raised to 75° C. and the acetone distilled off. The complete removal of the acetone is ensured by the application of a vacuum towards the end of the distillation.

A transparent binder dispersion is obtained, with a solids content of 38 wt %, an acid number of 23, a hydroxyl number of 130 and an amine content of 30 meq/100 g of solid resin.

EXAMPLE 2

Preparation of a water-dilutable binder for two-component OH/NCO lacquers

To 200 g of the aqueous binder dispersion obtained in example 1 there is added a solution of 50 g of a customary commercial aliphatic polyisocyanate with an NCO content of 22 wt % in 25 g of butoxyethanol. The mixture is homogenized with stirring. A dispersion with a pot life of 4 hours results. The dispersion obtained is applied to test plates by spraying. On drying at room temperature it could be observed that bubble-free coatings could be obtained at up to coat thicknesses of more than 100 µm dry coat thickness.

We claim:
1. A process for the manufacture of a reactive aqueous coating agent suitable for use on a substrate, comprising:
obtaining an aqueous composition of a water-dispersible or water-soluble polymeric binder and a combination of at least one polyamine having primary secondary amino groups or both and at least one tertiary monoamine, wherein the polymeric binder has acidic groups and isocyanate-reactive groups, a number-average molecular weight of 1000 to 100,000, an equivalent hydroxyl number for the isocyanate-reactive groups of about 20 to about 250 or the same number of other isocyanate reactive groups and an acid number of about 10 to 100; the combination has at least partially neutralized the polymeric binder at a degree of neutralization of from about 50% to 100% and the equivalent ratio of tertiary monoamine to polyamine is from about 2:1 to 6:1;
combining the aqueous composition and at least one polyisocyanate to form a composition of unreacted polymeric binder and emulsified polyisocyanate as the reactive coating agent, the combining step occurring no more than about two hours before application of the aqueous coating agent to the substrate, and the polyisocyanate being a liquid or being combined with an organic solvent to form a liquid.

2. A process according to claim 1 further comprising mixing a pigment, a filler, a lacquer additive or a combination thereof with the aqueous dispersion.

3. A process according to claim 1 wherein the polymer binder has an acid number of about 20 to 60.

4. A process according to claim 1 wherein the polymeric binder contains hydrophilic groups formed from about 1 to 150 meq ethylene oxide units per 100 g of polymer binder.

5. A process according to claim 1 wherein the amount of polyamine present is about 5 to 25 meq and the amount of tertiary monoamine present is about 10 to 45 meq, the meq's being relative to 100 g of binder polymer, and the meq amount of tertiary amine being more than the meq amount of polyamine.

6. A reactive aqueous coating agent comprising:
   an aqueous dispersion of at least one water-dispersible or water-soluble polymer binder having isocyanate-reactive groups and acidic groups, a combination of at least one polyamine having primary or secondary amino groups or both and at least one tertiary amine, and at least one polyisocyanate, wherein:
   the polymer binder has a number average molecular weight of about 1,000 to about 100,000, has an equivalent hydroxyl number for the isocyanate-reactive groups of about 20 to about 250 or the same number of other isocyanate reactive groups, and has an acid number of about 10 to 100; the combination has at least partially neutralized the polymeric binder at a degree of neutralization of from about 50 percent to 100 percent, the equivalent ratio of tertiary monoamine to polyamine is from about 2:1 to 6:1, and the polyisocyanate is a liquid or is in liquid form as a result of its combination with an organic solvent and is emulsified by the polymer binder.

7. An aqueous coating agent according to claim 6 further comprising a pigment, a filler, a lacquer additive or a combination thereof contained in the mixture.

8. A coating agent according to claim 6 wherein the polymer binder has an acid number of about 20 to 60.

9. A coating agent according to claim 6 wherein the polymer binder contains hydrophilic groups formed from 1 to 150 meq ethylene oxide units per 100 g of polymer binder.

10. A coating agent according to claim 6 wherein the amount of polyamine present is from about 5 to 25 meq and the amount of tertiary monoamine present is about 10 to about 45 meq, the meq being relative to 100 g of polymer binder, and the meq amount of tertiary amine is more than that of the polyamine.

11. A process for application of a reactive aqueous coating agent to a substrate comprising:
   combining at least one water-dispersible or water-soluble polymer binder, water and at least one polyisocyanate to form an unreacted aqueous dispersion of the polymer binder and emulsified polyisocyanate as the aqueous coating agent;
   applying the unreacted dispersion to the substrate no more than about 2 hours after formation of the unreacted mixture to form a film of the unreacted mixture on the substrate; and
   drying the film at an ambient to warm temperature to remove water from the film and cause reaction of the polymer binder and the polyisocyanate to form a cured coating on the substrate; wherein
   the polymer binder (a) has acidic groups which are at least partially neutralized by a combination of at least one polyamine with primary or secondary amino groups or both and at least one tertiary amine, the degree of acidic group neutralization being from about 50 percent to about 100 percent and the equivalent ratio of tertiary monoamine to polyamine being from about 2:1 to about 6:1, (b) has an acid number of from about 10 to about 100, (c) has isocyanate-reactive groups, and (d) has an equivalent hydroxyl number for the isocyanate-reactive groups of from about 20 to about 250 or the same number of other isocyanate reactive groups, and (e) has a number average molecular weight of about 1,000 to 100,000; and the polyisocyanate is a liquid or is rendered in liquid form by its mixture with an organic solvent, and the ratio of isocyanate groups to isocyanate-reactive groups is about 0.5:1 to about 5:1.

12. A process according to claim 11 wherein the applied aqueous coating agent is dried at a temperature of about 25° to 80° C.

* * * * *